(12) United States Patent
Matsuoka

(10) Patent No.: US 7,828,591 B2
(45) Date of Patent: Nov. 9, 2010

(54) CONNECTOR FOR A DEVICE

(75) Inventor: Hiroyuki Matsuoka, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 91 days.

(21) Appl. No.: 12/262,693

(22) Filed: Oct. 31, 2008

(65) Prior Publication Data

US 2009/0124121 A1 May 14, 2009

(30) Foreign Application Priority Data

Nov. 9, 2007 (JP) .............................. 2007-292319

(51) Int. Cl.
*H01R 13/73* (2006.01)
(52) U.S. Cl. .............. 439/559; 439/607.01; 439/607.55
(58) Field of Classification Search ................. 439/550, 439/559, 607.01, 607.55
See application file for complete search history.

(56) References Cited

U.S. PATENT DOCUMENTS

| | | | | |
|---|---|---|---|---|
| 4,743,210 | A * | 5/1988 | Schild et al. ................. | 439/559 |
| 5,158,391 | A * | 10/1992 | Fujitani et al. .............. | 403/288 |
| 5,779,493 | A * | 7/1998 | Tomita et al. ............... | 439/271 |
| 6,953,357 | B2 * | 10/2005 | Fukushima et al. .......... | 439/271 |
| 7,094,098 | B2 | 8/2006 | Miyazaki | |
| 7,097,498 | B2 * | 8/2006 | Miyazaki ..................... | 439/559 |
| 7,481,676 | B2 * | 1/2009 | Walter et al. ........... | 439/607.01 |
| 7,568,932 | B2 * | 8/2009 | O'Connor .................... | 439/271 |
| 7,572,150 | B2 * | 8/2009 | Matsuoka .................... | 439/626 |
| 2002/0155756 | A1 * | 10/2002 | Yoshioka ..................... | 439/607 |
| 2007/0184701 | A1 * | 8/2007 | Yagome et al. ............. | 439/271 |
| 2009/0029594 | A1 * | 1/2009 | Matsuoka .................... | 439/626 |
| 2009/0124121 | A1 * | 5/2009 | Matsuoka .................... | 439/550 |
| 2010/0034613 | A1 * | 2/2010 | Sakakura et al. ............ | 411/110 |

* cited by examiner

*Primary Examiner*—James Harvey
(74) *Attorney, Agent, or Firm*—Gerald E. Hespos; Michael J. Porco

(57) ABSTRACT

A connector for device is for supplying power to a device accommodated in a metallic casing (C) and provided with a housing (10) to be mounted into a mount hole (H) of the casing (C) and intermediate terminals (14) connectable with a power supply side and a device side. The housing (10) is formed with a flange (12) arranged to face an outer surface of the casing (C) when the housing (10) is mounted into the mount hole (H), a ring-shaped seal (30) for surrounding the mount hole (H) over the entire circumference is mounted on a facing surface (17) of the flange (12) facing the outer surface of the casing (C), and the seal (30) is held in close contact with the facing surface (17) and the outer surface of the casing (C) to seal between these surfaces with the housing (10) mounted on the casing (C).

14 Claims, 17 Drawing Sheets

CONNECTOR FOR A DEVICE

BACKGROUND OF THE INVENTION

1. Field of the Invention

The invention relates to a connector for supplying power to a device accommodated in a conductive casing.

2. Description of the Related Art

U.S. Pat. No. 7,094,098 discloses a connector for supplying power to a device, such as motor, accommodated in a metallic casing in an electric automotive vehicle or the like. This connector has a waiting-side housing that is mounted at a back side of a mount hole that penetrates the casing in inward and outward directions. The connector also has a wire-side housing that is mounted at a front side of the mount hole and that is connectable with the waiting-side housing. Wire-side terminals connected with ends of wires are held in the wire-side housing and are connected with ends of terminals held in the waiting-side housing. The opposite ends of the terminals in the waiting-side housing are connected with terminals directly connected with the device.

Seal rings are fit on the outer peripheral surfaces of the waiting-side housing and the wire-side housing. The seal rings closely contact the front and rear sides of the peripheral surface of the mount hole to provide sealing between the two housings and the mount hole and to prevent the entry of water and the like through the mount hole.

The peripheral surface of the mount hole of the above-described casing should closely contact the seal rings to ensure a high sealing property in the sealed structure and therefore the peripheral surface of the mount hole should be smooth. However, the peripheral surface of the mount hole is not always smooth due to a cast nest or the like. Hence, there is a problem of ensuring a high sealing property.

The present invention was developed in view of the above situation and an object thereof is to ensure a high sealing property.

SUMMARY OF THE INVENTION

The invention relates to a connector for supplying power to a device that is accommodated in a conductive casing. The connector includes a housing to be mounted into a mount hole of the casing and at least one terminal is retained in the housing. The terminal has one portion connectable with a power supply side and another portion connectable with a device side. The housing has a flange arranged to substantially face an outer surface of the casing when the housing is mounted in the mount hole. A ring-shaped seal is mounted on a facing surface of the flange that substantially faces the outer surface of the casing. The seal is to be held in close contact with the facing surface and the outer surface of the casing to seal between these surfaces when the housing is mounted on the casing. The flange presses the seal against the outer surface of the casing to ensure a high sealing property.

A surface of the flange opposite the facing surface may be substantially covered by a conductive shielding shell that is fixed to the casing. Additionally, the shielding shell may have at least one rib that can contact a part of the flange where the seal is to be mounted. Then, a clearance is less likely to be formed between the case and the flange as compared with the case where the shielding shell and the flange are in surface contact in the part of the flange where the seal is mounted. As a result, displacements of the flange can be prevented and a high sealing property can be ensured.

The flange may include at least one mounting wall projecting substantially along the inner peripheral edge of the seal. The mounting wall prevents an inward displacement of the seal.

The mounting wall may have a substantially ring shape that conforms with the inner peripheral edge of the seal over substantially the entire periphery. Thus, inward displacement of the seal is prevented over substantially the entire periphery.

The flange portion and the seal member may include one or more projection-shaped and recess-shaped engaging portions. This enables the seam member to be held mounted on the flange portion by the engagement of the engaging portions.

Engaging portions may be provided along a peripheral direction of the seal. The engaging portions enable the seal to be held on the flange and prevent peripheral displacements of the seal.

At least one of the engaging portions may have a tapered projecting end. The tapered end enables the engaging portion to be engaged easily so that the seal can be mounted easily.

The engaging portion of the seal may be engaged in resilient contact with the engaging portion of the flange. Thus, the seal is held reliably in a mounted state and is more difficult to disengage.

The engaging portions may include a projecting engaging portion that projects from the flange towards the casing and a tubular engaging portion formed integral to the seal for fitting to the projecting engaging portion.

The mounting wall may be shaped to extend at least partly substantially along the outer periphery of the tubular engaging portion. The mounting wall prevents deformation of the tubular engaging portion of the seal.

The shielding shell may include an outer peripheral wall for at least partly covering an outer peripheral side of the seal. The outer peripheral wall prevents outward displacement of the seal.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
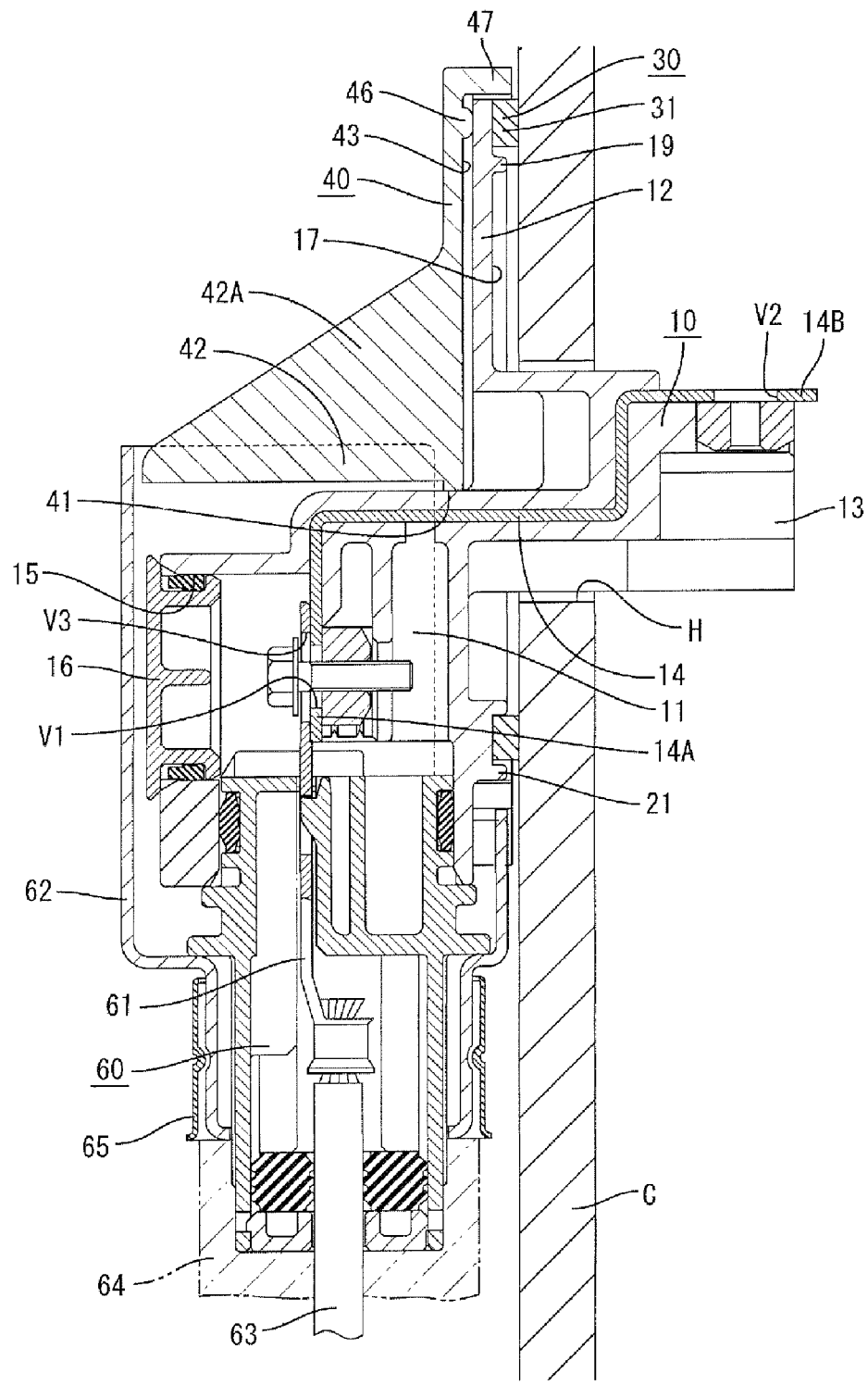
FIG. 1 is a side view in section showing a state where a connector for device according to a first embodiment is mounted on a casing and connected with a wire-side housing.
Figure 2:
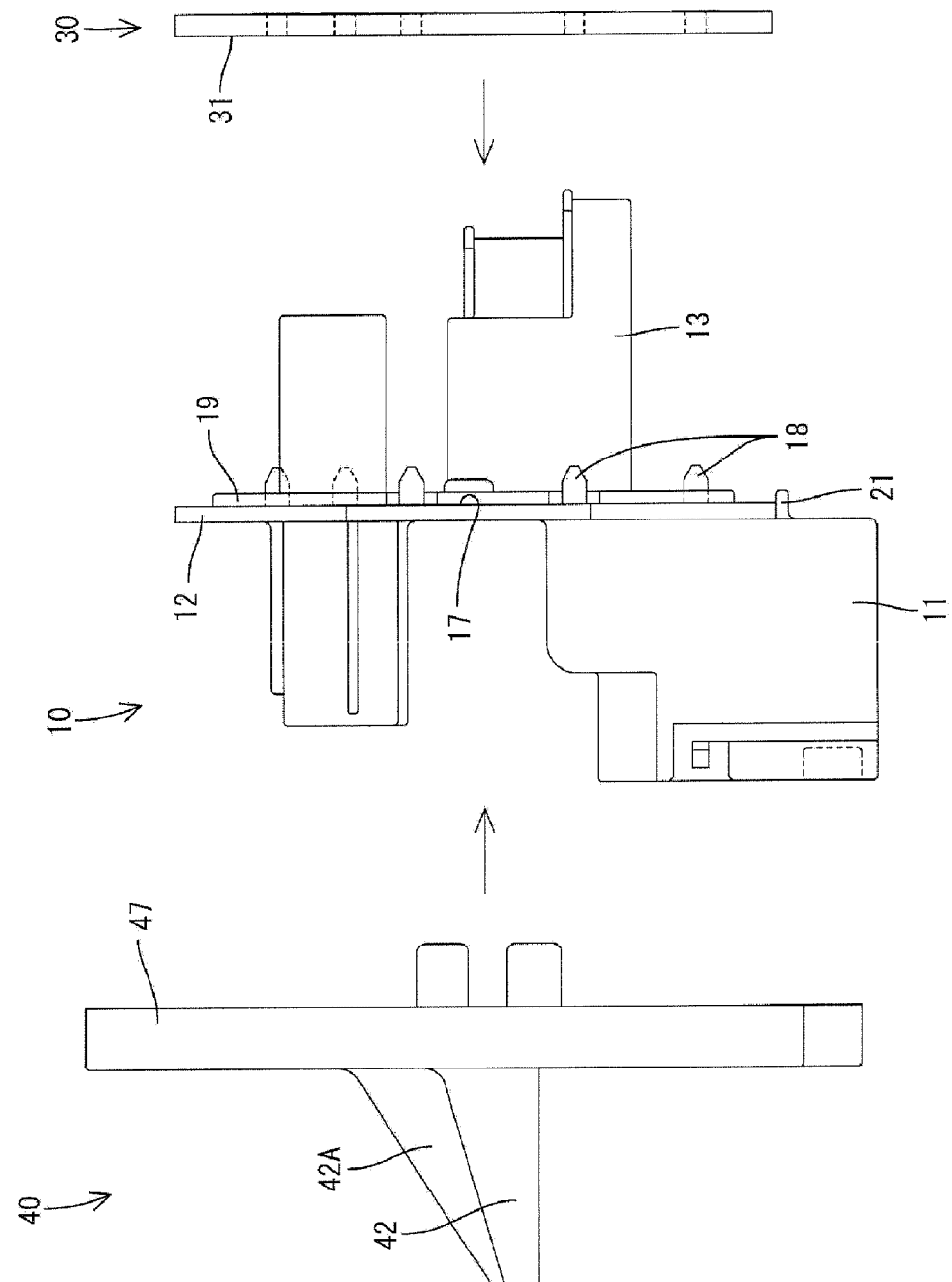
FIG. 2 is a side view showing a state before a shielding shell, an intermediate housing and a seal member are mounted.
Figure 3:
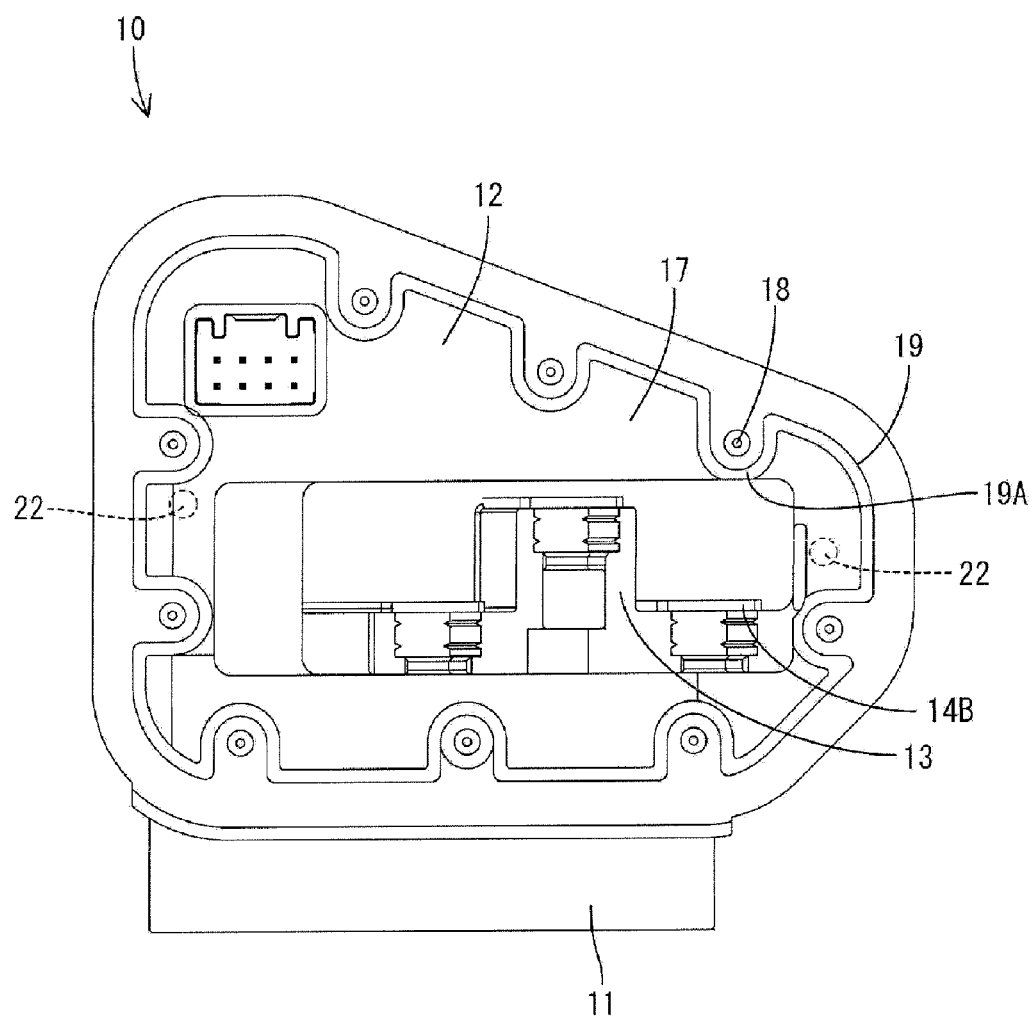
FIG. 3 is a rear view of the intermediate housing.

A connector in accordance with a first embodiment of the invention is described with reference to FIGS. 1 to 10. The connector of this embodiment is for supplying power to an unillustrated device (e.g. a motor, an inverter or the like installed in a hybrid vehicle or the like). The device is to be accommodated in a conductive metallic casing C having a shielding function. At least one mount hole H penetrates the casing C between the outer and inner surfaces.

The connector has an intermediate housing 10 to be mounted in the mount hole H of the casing C. The intermediate housing 10 includes a main body 11 made e.g. of synthetic resin and substantially in the form of a wide rectangular parallelepiped arranged outside the casing C. A plate-shaped flange 12 extends up from the opposite sides of the rear end of the housing main body 11. A device-side projection 13 projects back from the rear surface of the flange 12 and is arranged in the casing C. The housing main body 11, the flange 12 and the device-side projection 13 are formed unitarily.

The housing main body 11 has a substantially box shape with a hollow interior, and a wire-side housing 60 can fit into the hollow interior from below. Intermediate terminals 14 are held in the intermediate housing 10, and wire-side connecting portions 14A of the intermediate terminals 14 are arranged side by side in a lateral direction in the housing main body 11. Each wire-side connecting portion 14A has a bolt hole V1 that can register with an operation hole 15 in the housing main body 11. The wire-side housing 60 is fit into the housing main body 11 and then the wire-side connecting portion 14A is connected with the corresponding wire-side terminal 61 by tightening a bolt. A cap 16 then is mounted to close the operation hole 15.

Device-side connecting portions 14B of the intermediate terminals 14 are insert molded in the device-side projection 13 of the intermediate housing 10. Each device-side connecting portion 14B has a bolt hole V2 and is connected with the corresponding device-side terminal by tightening a bolt.

A facing surface 17 of the flange 12 faces the outer surface of the casing C and is substantially flat except for a part corresponding to the device-side projection 13.

Engaging projections 18 project back towards the casing C from areas near a peripheral edge of the facing surface 17 of the flange 12. More specifically, the engaging projections 18 are provided at three positions of each of upper and lower edges of the flange 12, at two positions of the longer left side edge in FIG. 3 and at one position of the shorter right side edge in FIG. 3. The respective engaging projections 18 are substantially cylinders with tapered projecting ends (see FIG. 2).

A mounting wall 19 extends substantially continuously along portions of the facing surface 17 of the flange 12 inward of the outer peripheral edge of the flange 12. Most parts of the mounting wall 19 are spaced from the outer peripheral edge of the flange 12 by a selected uniform distance, and are closer to the outer peripheral edge of the flange 12 than the engaging projections 18. Thus, most parts of the mounting wall 19 are substantially parallel to the outer peripheral edge of the flange 12. However, the mounting wall 19 includes enclosing portions 19A that are substantially concentric with and spaced from sides of the engaging projections 18 that face inwardly and away from the outer peripheral edge of the flange 12. The mounting wall 19 has a substantially annular shape and a shorter projecting height than the engaging projections 18.

A complementary wall 21 projects in substantially the same direction as the mounting wall 19 from the facing surface 17 at positions along the lower peripheral edge of the flange 12. The height of the complimentary wall 21 is substantially equal to the height of the mounting wall 19. The complementary wall 21 is formed in a range longer than the width of the housing main body 11 and projects towards the opposite sides from the housing main body 11 (see FIGS. 3 and 7).

The flange 12 has a front surface opposite the facing surface 17. Two substantially round positioning recesses 22 extend back at opposite widthwise ends of the front surface of the flange 12 and at substantially opposite sides of the housing main body 11. Circumferential surfaces of the positioning recesses 22 are uneven.

A seal 30 made of rubber or another resilient material is mounted on the facing surface 17 of the flange 12. The seal 30 includes a ring-shaped main body 31 dimensioned to surround the entire periphery of the mount hole H and the outer periphery of the mounting wall 19. The seal main body 31 has a substantially constant width over the entire periphery, and has flat front and rear surfaces that are substantially parallel to each other (see FIG. 2). The thickness of the seal main body 31 is smaller than the width thereof.

Figure 4:
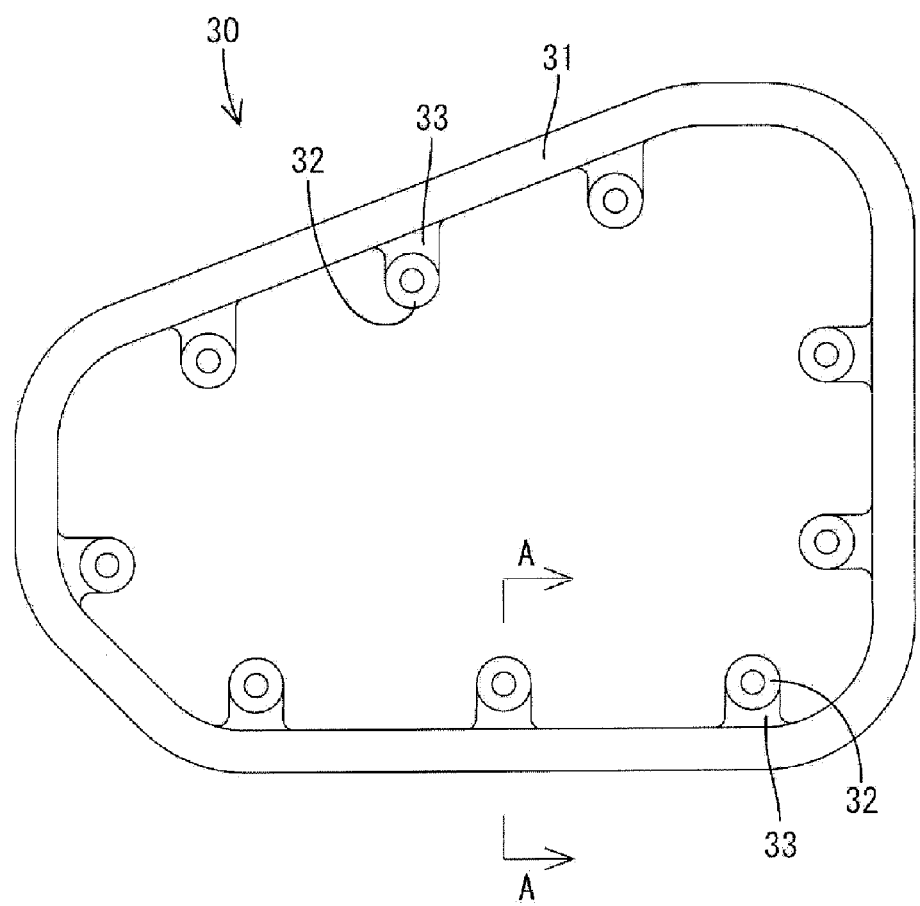
FIG. 4 is a front view of the seal member.
Figure 5:
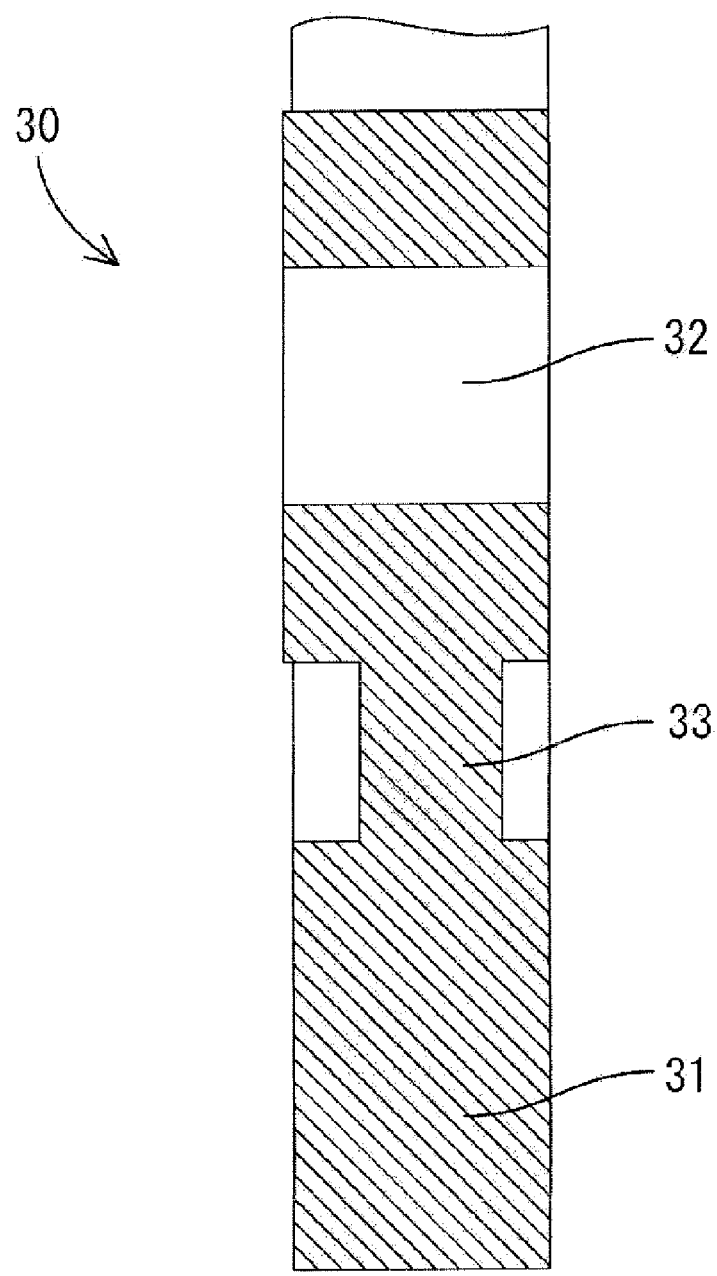
FIG. 5 is a section along A-A of FIG. 4.
Figure 6:
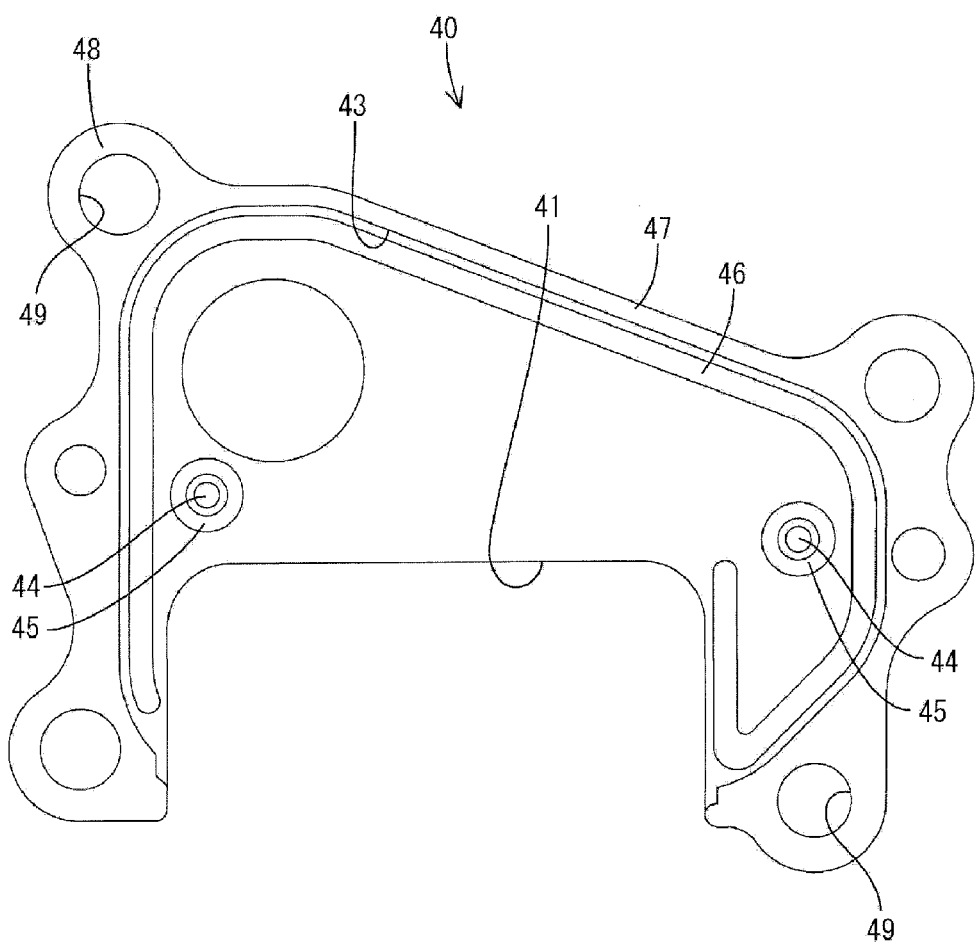
FIG. 6 is a rear view of the shielding shell.
Figure 7:
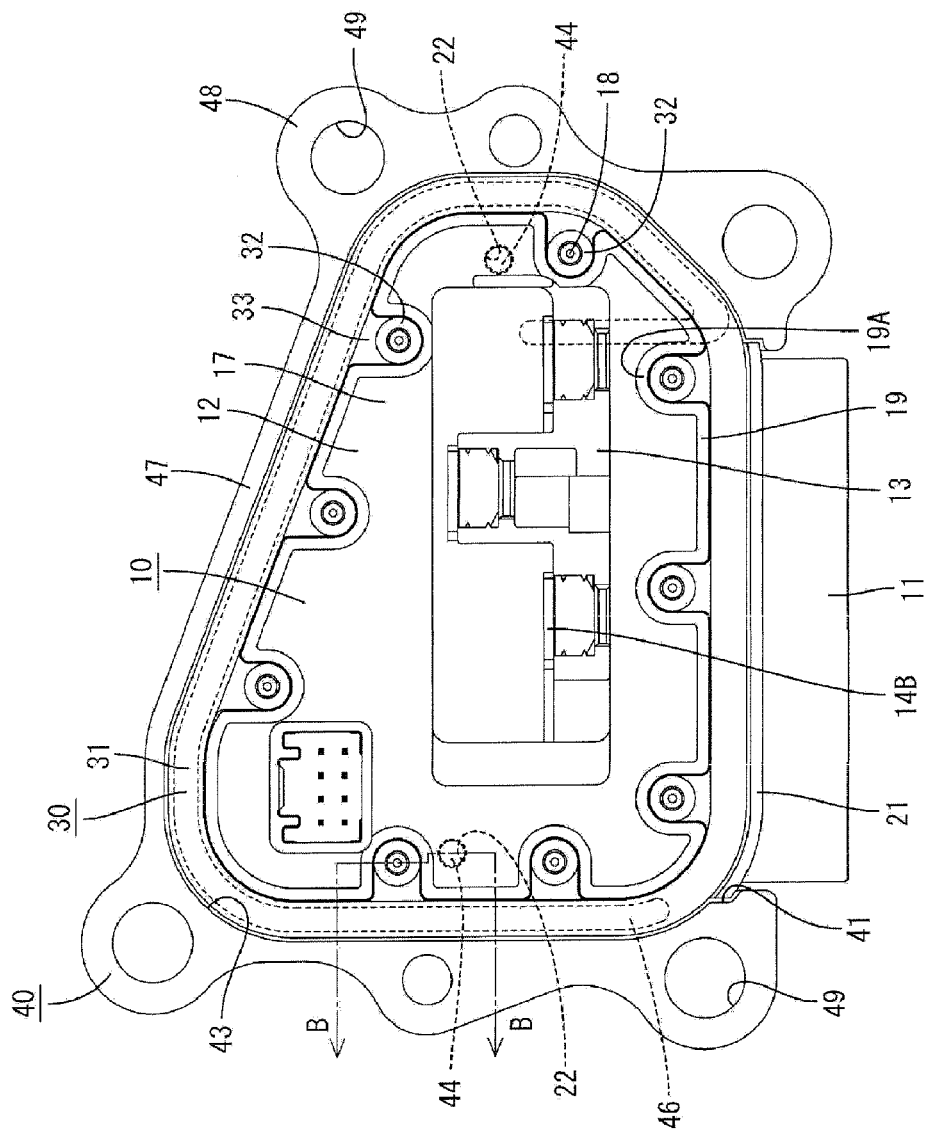
FIG. 7 is a rear view showing a state where the shielding shell, the intermediate housing and the seal member are mounted.
Figure 8:
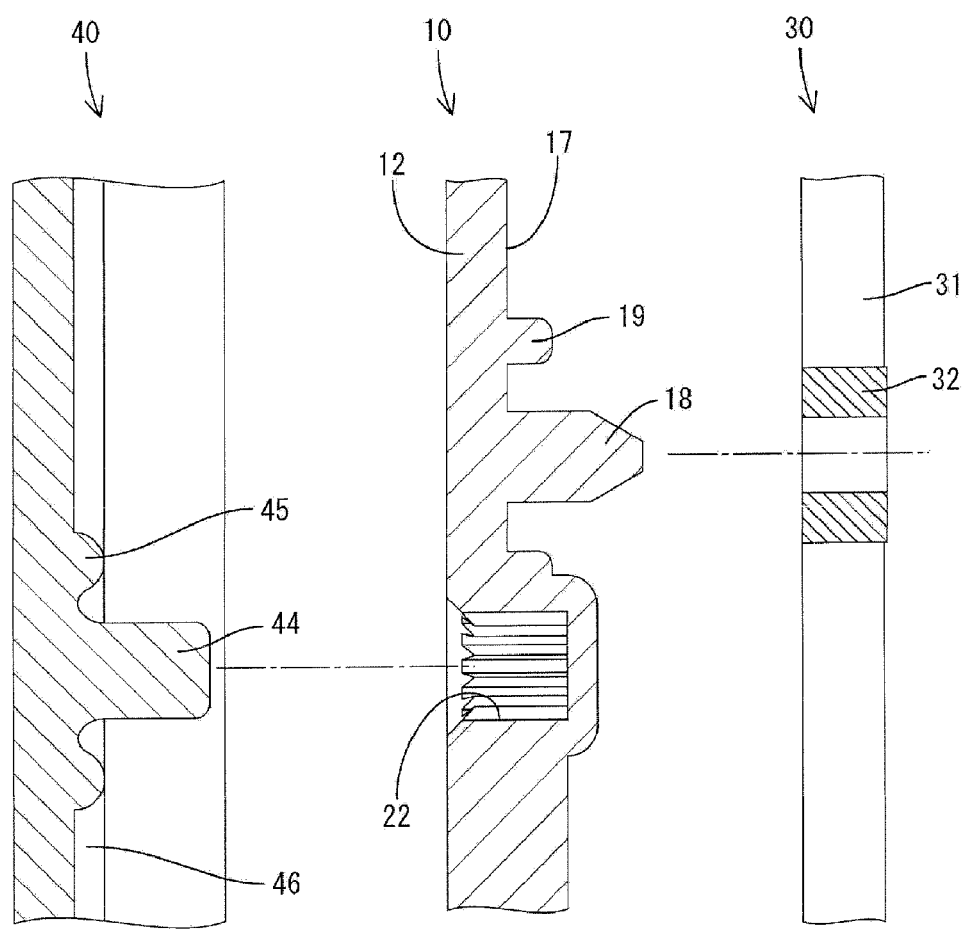
FIG. 8 is a section along B-B of FIG. 7 showing the state before the shielding shell, the intermediate housing and the seal member are mounted.
Figure 9:
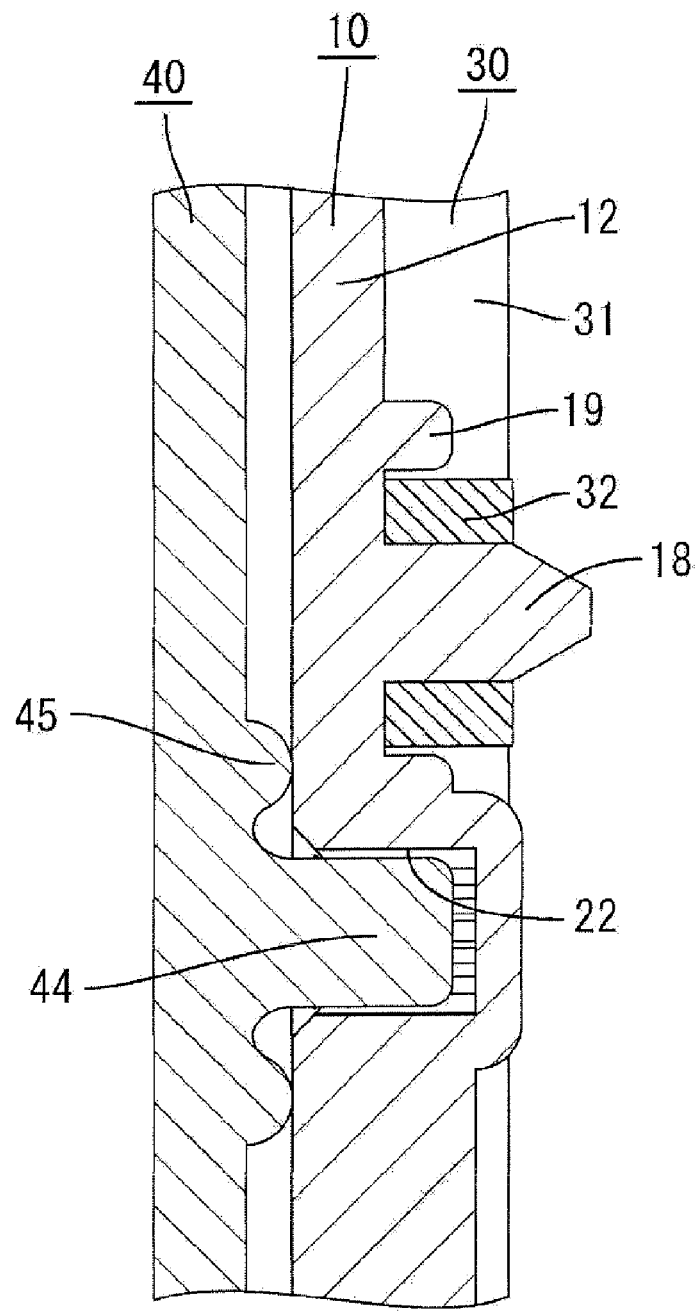
FIG. 9 is a section along B-B of FIG. 7.
Figure 10:
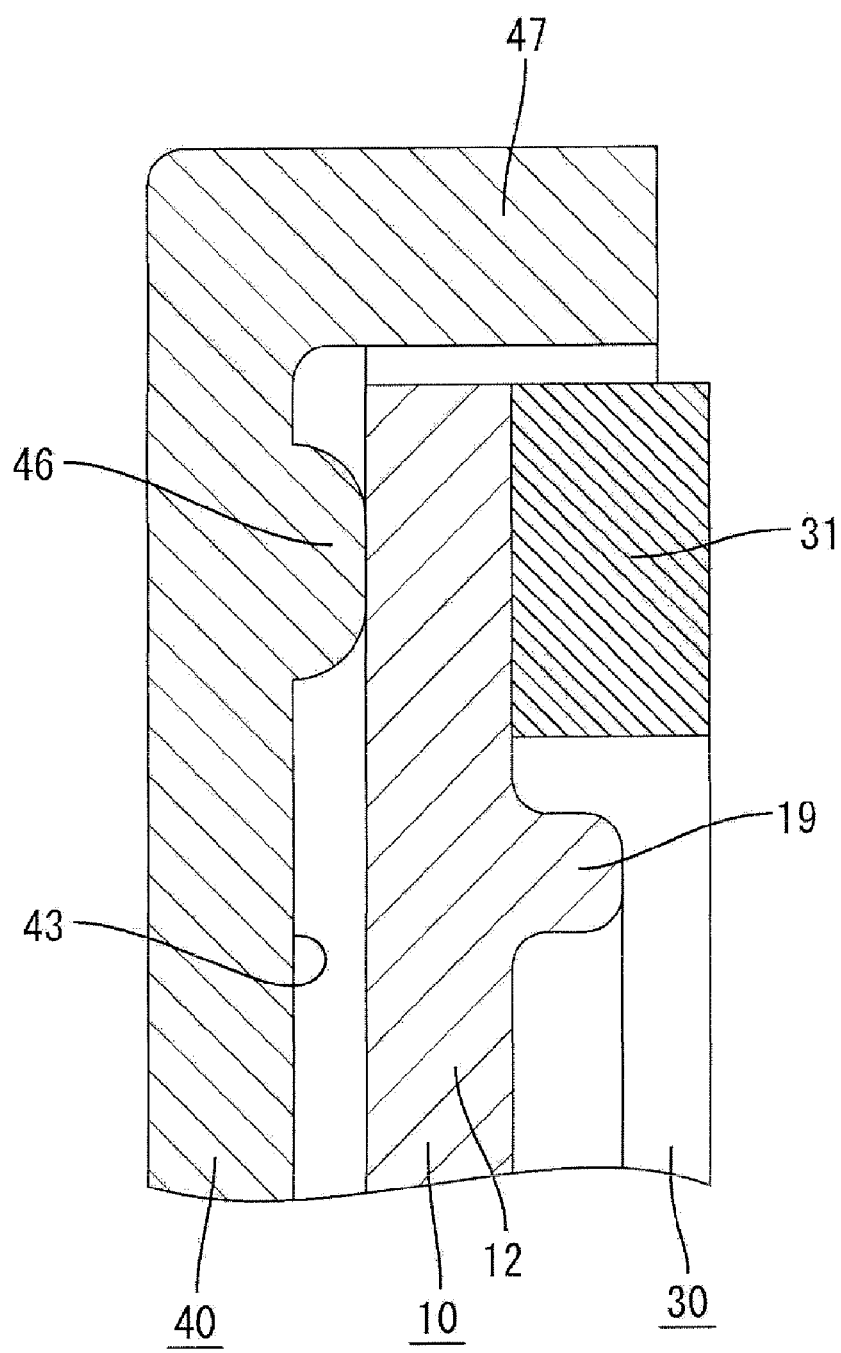
FIG. 10 is a partial enlarged section showing a state where a rib is in contact with a flange portion.
Figure 11:
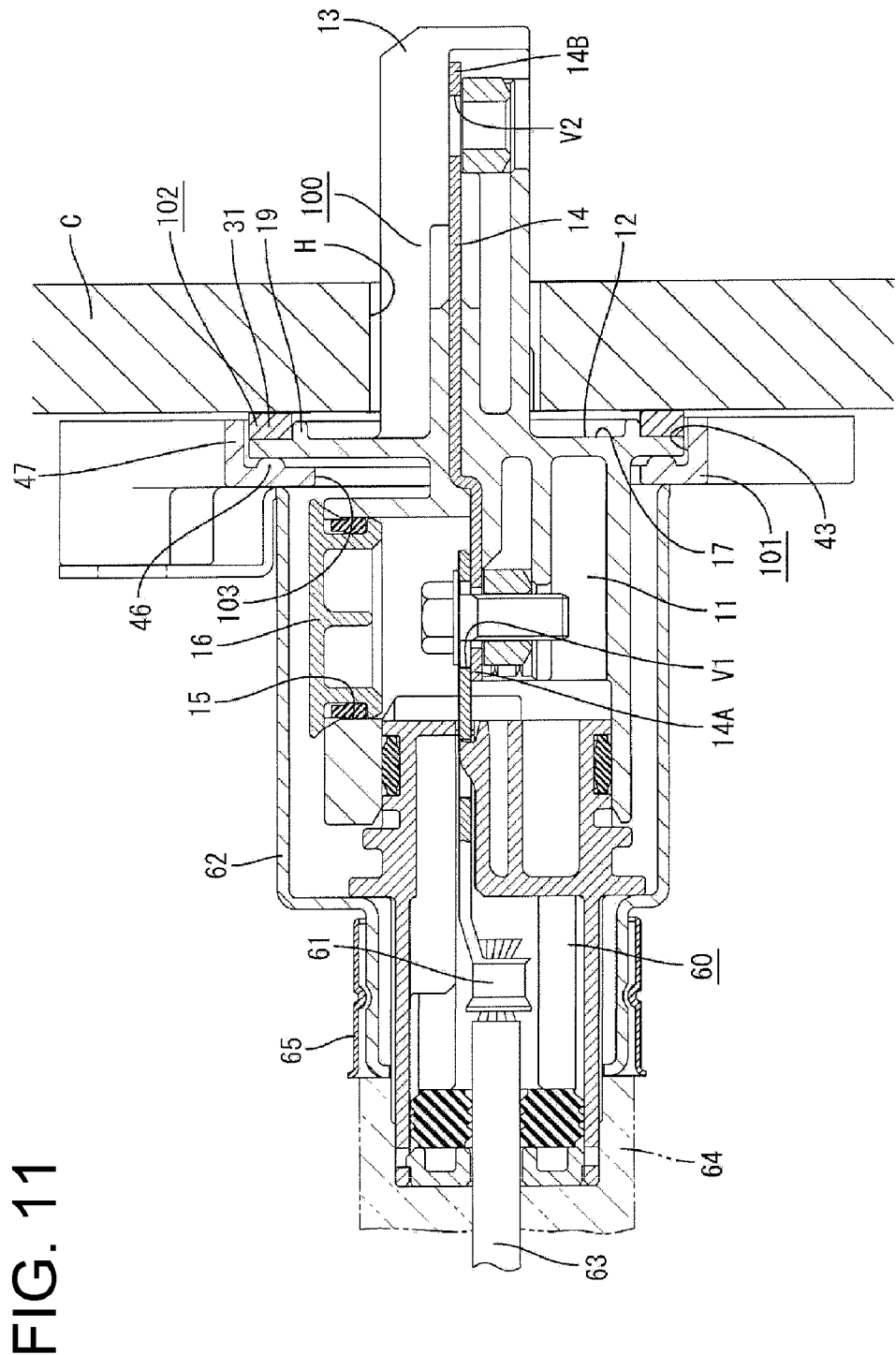
FIG. 11 is a side view in section showing a state where a connector for device according to a second embodiment is mounted on a casing and connected with a wire-side housing.
Figure 12:
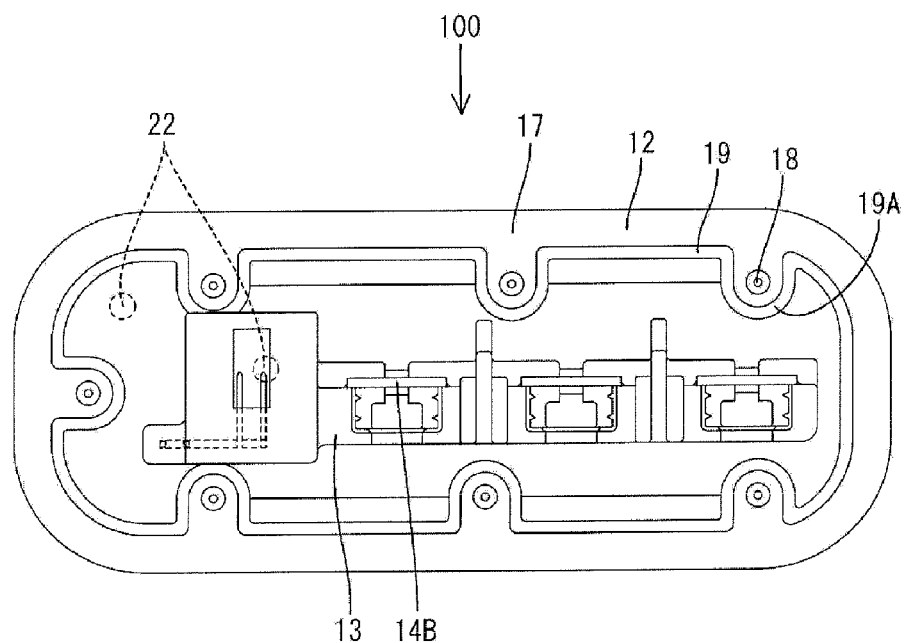
FIG. 12 is a rear view of an intermediate housing.
Figure 13:
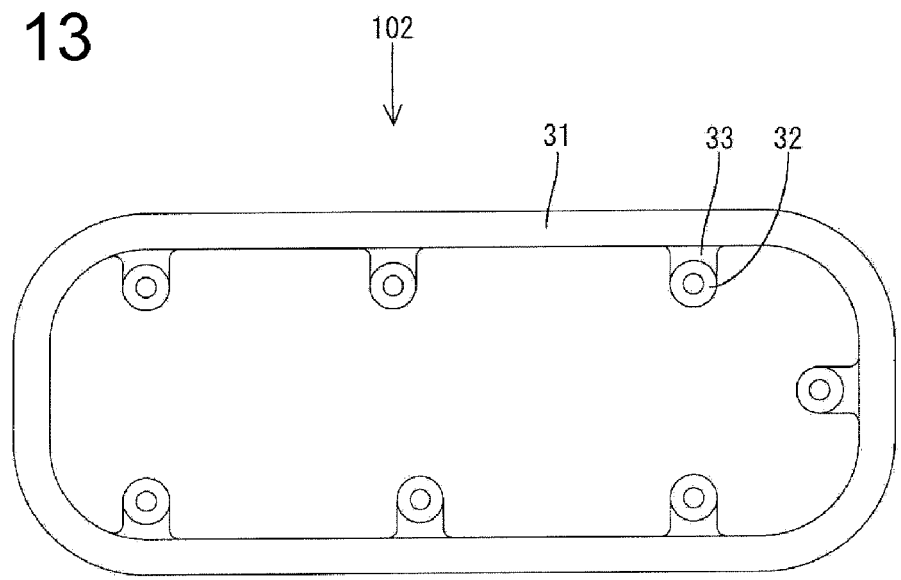
FIG. 13 is a front view of a seal member.
Figure 14:
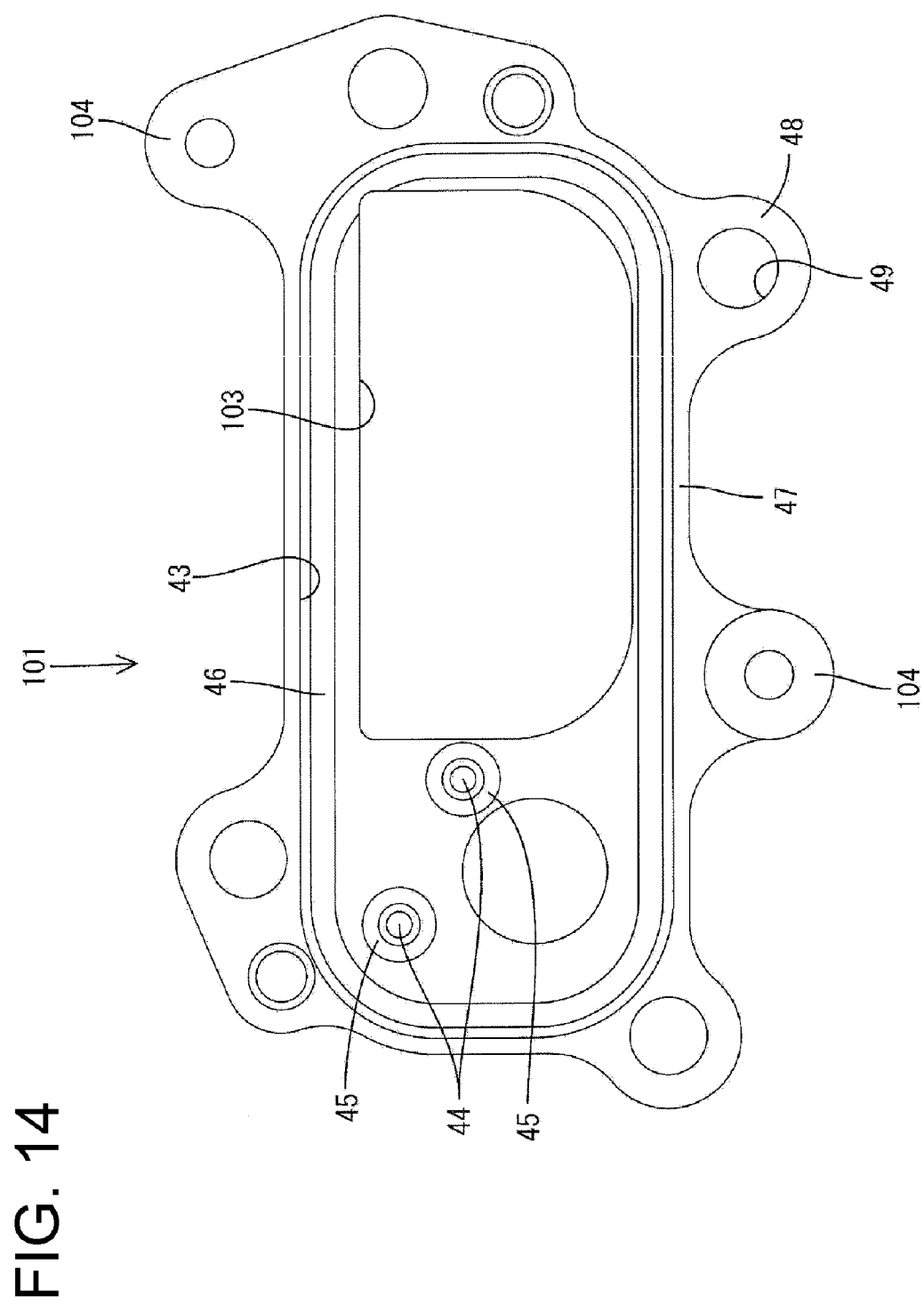
FIG. 14 is a rear view of a shielding shell.
Figure 15:
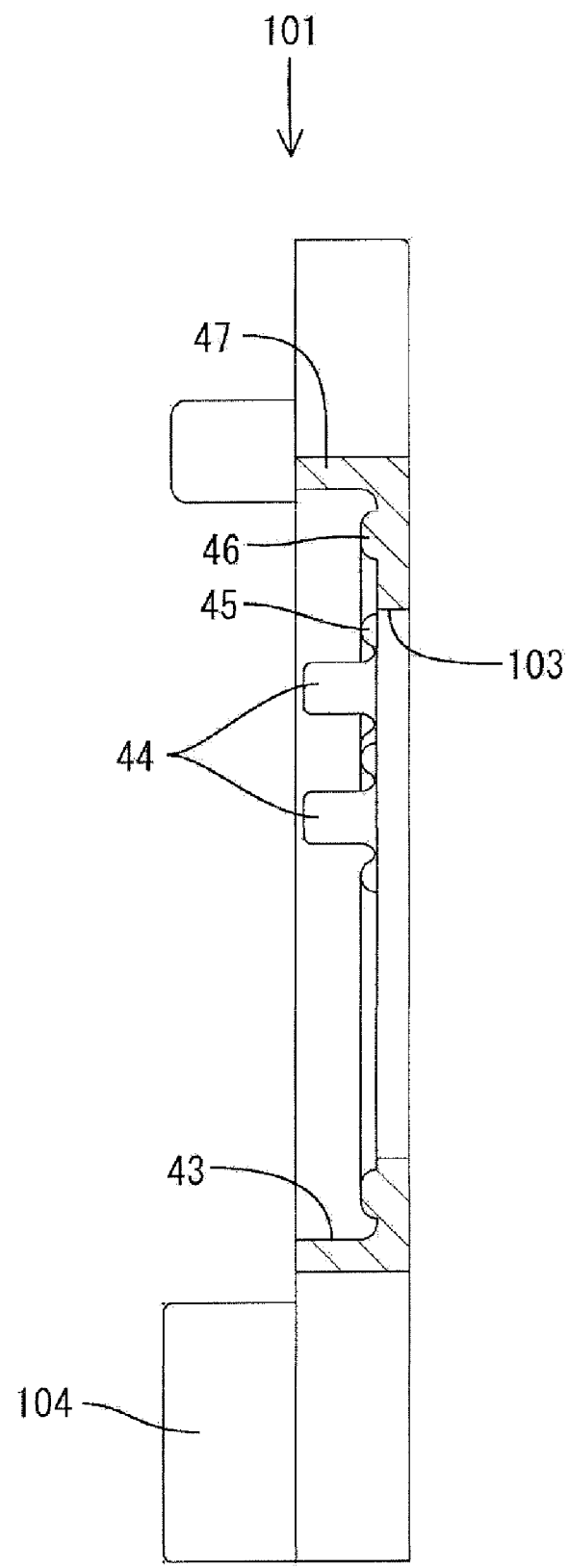
FIG. 15 is a side view in section of the shielding shell.
Figure 16:
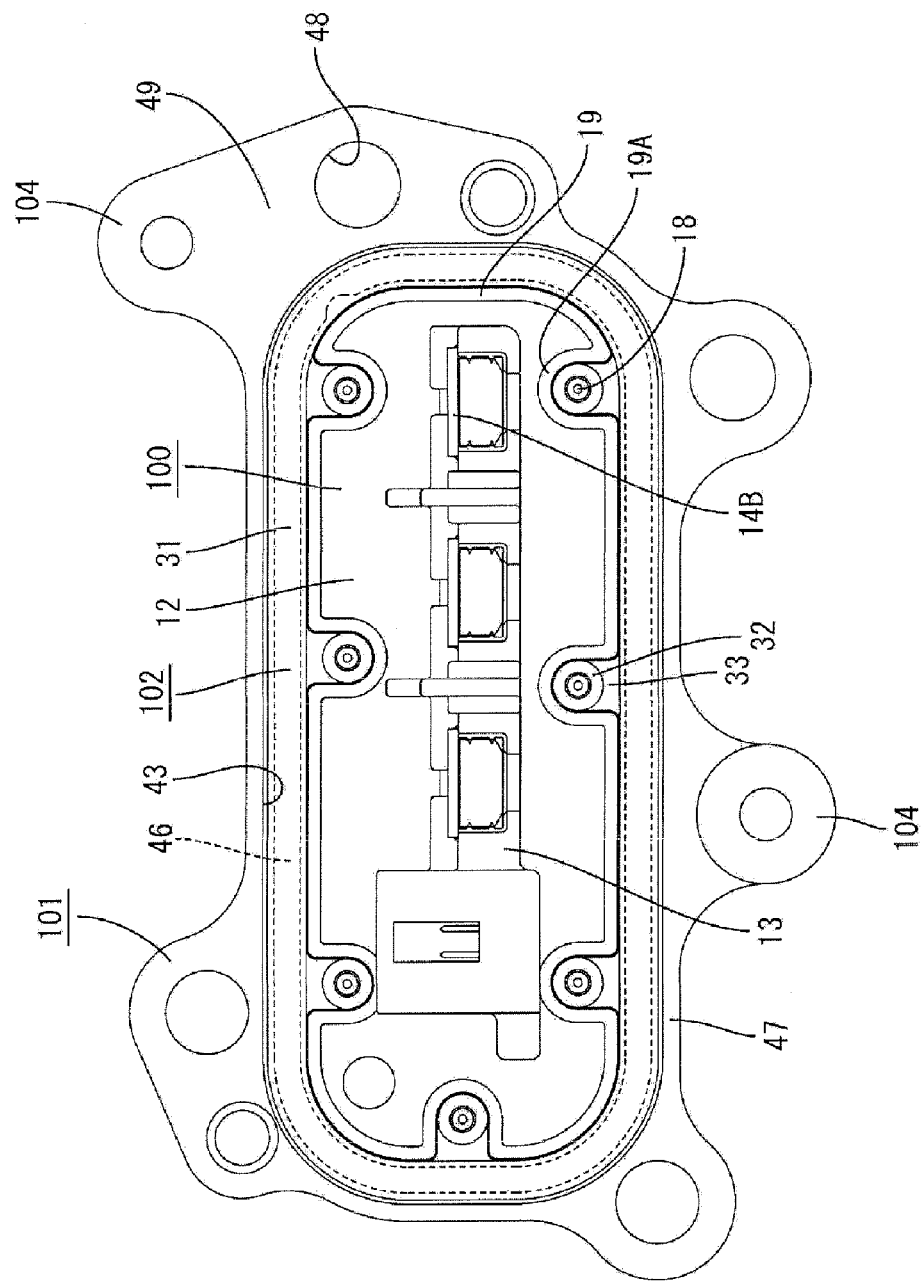
FIG. 16 is a rear view showing a state where the shielding shell, the intermediate housing and the seal member are mounted.
Figure 17:
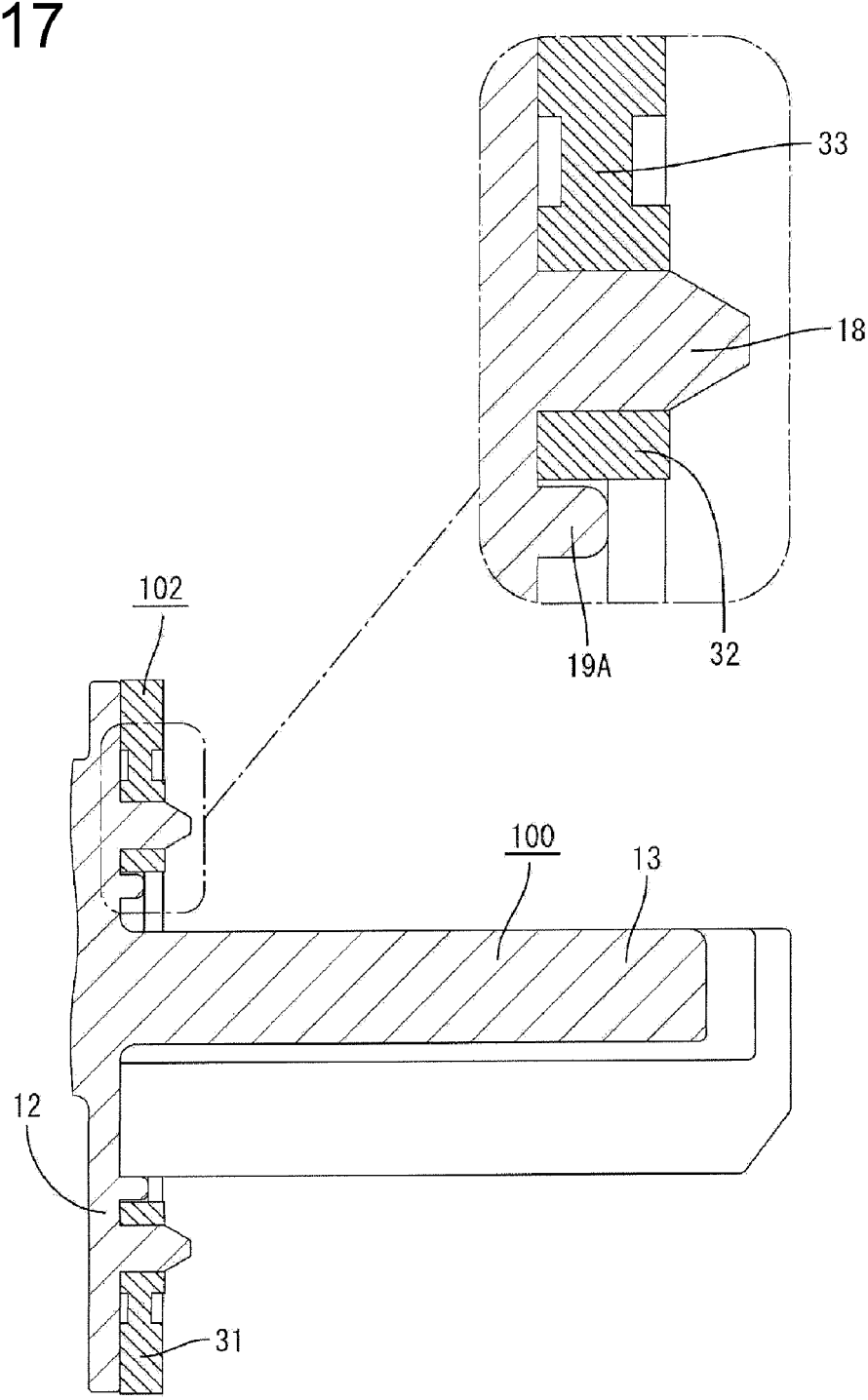
FIG. 17 is a partial enlarged section showing a state where the seal member is mounted on the intermediate housing.
Figure 18:
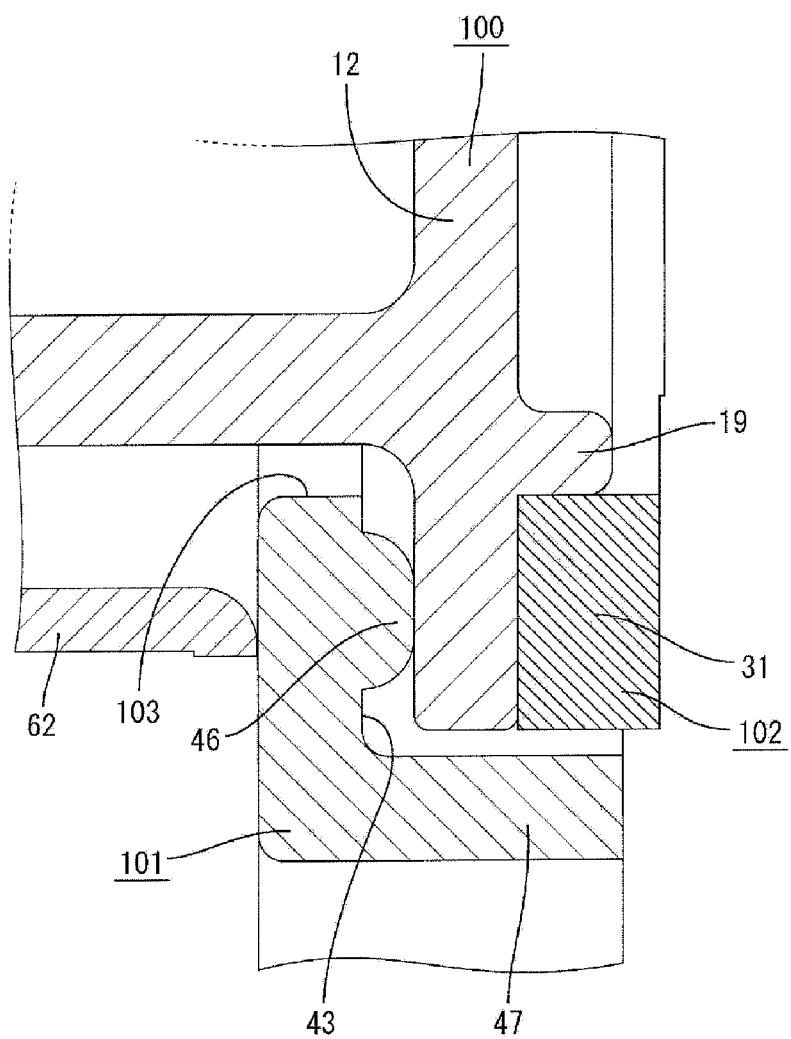
FIG. 18 is a partial enlarged section showing a state where a rib is in contact with a flange portion.

As shown in FIG. 4, tubular engaging portions 32 are provided at the inner peripheral side of the seal main body 31. The tubular engaging portions 32 are at positions corresponding to the engaging projections 18 of the flange 12 and are dimensioned to fit on the engaging projections 18. The tubular engaging portions 32 are joined unitarily to the seal main body 31 by thin portions 33 that are thinner than the seal main body 31 (see FIG. 5). The width of the thin portions 33 is substantially equal to the outer diameter of the tubular engaging portions 32, and the inner diameter of the tubular engaging portions 32 is slightly smaller than the diameter of the engaging projections 18.

An aluminum die-cast shielding shell 40 covers the front surface of the flange 12 and has an outer shape that is slightly larger than the flange 12. A substantially rectangular escaping portion 41 is formed in a lower portion of the shielding shell 40 and extends along the outer shape of the housing main body 11 (see FIG. 6).

The shielding shell 40 is formed unitarily with a back wall 42 that extends substantially forward along the rear edge of the escaping portion 41 (see FIG. 1). The back wall 42 has a substantially wide rectangular shape that is slightly larger than the upper surface of the housing main body 11 so that the back wall 42 covers the housing main body 11 from above. Reinforcing plates 42A are formed unitarily on the rear surface of the back wall 42.

An accommodation recess 43 is formed in the rear surface of the shielding shell 40 and is configured to accommodate the flange 12. The accommodation recess 43 is shaped to conform substantially to the outer shape of the flange 12 and has a depth substantially equal to a backward projecting distance of the rear surface of the seal 30 from the rear surface of the shielding shell 40 when the flange 12 is accommodated in the accommodation recess 43.

Substantially cylindrical positioning bosses 44 project back from opposite widthwise ends of the accommodation recess 43 at positions corresponding to the positioning recesses 22 of the flange 12. An annular rib 45 is formed around each positioning boss 44 (see FIGS. 6 and 8).

A rib 46 extends substantially continuously along a peripheral edge of the accommodation recess 43 and along the part of the flange 12 where the seal 30 is mounted (see FIG. 7) when the flange 12 is accommodated in the accommodation recess 43. Specifically, the rib 46 is disposed to contact the part of the flange 12 where the seal 30 is mounted from the front (see FIG. 10). Thus, the flange 12 is sandwiched between the rib 46 and the seal 30, and the shielding shell 40 is fixed to the casing C. The rib 46 is not disposed along the upper edge of the escaping portion 41. Projecting distances of the annular ribs 45 and the rib 46 are substantially equal.

An outer peripheral wall 47 is defined around the accommodation recess 43 of the shielding shell 40 for covering the outer peripheral side of the seal 30. The height of the outer peripheral wall 47 is set so that the outer peripheral wall 47 is located slightly more forward than the rear surface of the seal 30 when the flange 12 is accommodated in the accommodation recess 43. The outer peripheral wall 47 is not provided in the part of the shielding shell 40 where the escaping portion 41 is formed. The complementary wall 21 of the intermediate housing 10 is fit into the opening of the escaping portion 41 when the shielding shell 40 and the intermediate housing 10 are assembled. Thus, the outer peripheral wall 47 and the complementary wall 21 surround substantially the entire outer periphery of the seal 30.

Fixing portions 48 project sideways from the outer peripheral wall 47 of the shielding shell 40. Screw insertion holes 49 are formed in the fixing portions 48 and align with unillustrated screw holes of the casing C. Thus, the shielding shell 40 and the casing C are fixed in electrically conductive relationship by aligning the screw insertion holes 49 with the respective screw holes of the casing C and tightening screws. Thus, the flange 12 is sandwiched between the outer surface of the casing C and the shielding shell 40, and the seal 30 mounted on the flange 12 closely contacts the outer surface of the casing C (see FIG. 1) to provide sealing between the peripheral edge of the mount hole H of the casing C and the intermediate housing 10.

The wire-side housing 60 is made e.g. of synthetic resin, and three wire-side terminals 61 fixed to ends of wires 63 are accommodated therein. Upper ends of the wire-side terminals 61 extend up from the wire-side housing 60 and are arranged to overlap the wire-side connecting portions 14A of the intermediate terminals 14 when the wire-side housing 60 is fit into the intermediate housing 10. The upper end portion of each wire-side terminal 61 is formed with at least one bolt hole V3 to be aligned with the bolt hole V1 of the corresponding intermediate terminal 14.

A conductive aluminum die-cast wire-side shielding shell 62 is mounted on and covers the wire-side housing 60. An end of a shielding member 64, such as a braided wire or conductive film, is fixed to the wire-side shielding shell 62 by a crimp ring 65. The wire-side shielding shell 62 is screw-fixed to the casing C via the shielding shell 40. Thus, the wire-side shielding shell 62 cooperates with the back wall 42 of the shielding shell 40 to shield the wire-side housing 60 and the intermediate housing 10 that are connected with each other.

The connector is assembled by initially positioning the seal 30 so that the tubular engaging portions 32 of the seal 30 align with the engaging projections 18 of the flange 12 of the intermediate housing 10. The tubular engaging portions 32 then are pushed successively over the tapered leading ends of the engaging projections 18 and are widened by the engaging projections 18. Resilient restoring forces of the tubular engaging portions 32 act in diameter reducing directions against the outer circumferential surfaces of the engaging projections 18 so that disengagement is unlikely. Therefore the seal 30 is held reliably in a mounted condition on the intermediate housing 10.

The seal main body 31 is mounted on the outer side of the mounting wall 19 of the flange 12. At this time, the tubular engaging portions 32 and the seal main body 31 are connected by the thin portions 33 that are less rigid than the seal main body 31. Thus, the seal main body 31 can be arranged easily along the outer side of the mounting wall 19 after the tubular engaging portions 32 are fit on the engaging projections 18.

The engagement of the engaging projections 18 and the tubular engaging portion 32 prevents transverse or rotational displacement of the seal 30 on the flange 12. Therefore the seal 30 will not displace in response to various forces acting, for example, upon assembling the intermediate housing 10 and the shielding shell 40 or upon fixing these parts to the casing C.

The shielding shell 40 may be mounted next on the subassembly of the intermediate housing 10 and the seal 30. The flange 12 is accommodated into the accommodation recess 43 while the housing main body 11 is fit into the escaping portion 41 of the shielding shell 40. At this time, the positioning recesses 22 of the flange 12 engage the respective positioning bosses 44 of the accommodation recess 43 to position the shielding shell 40 and the intermediate housing 10. The annular ribs 45 around the positioning bosses 44 are held in contact with parts of the flange 12 around the positioning recesses 22 to prevent backlash between the flange 12 and the shielding shell 40. Further, the rib 46 of the shielding shell 40 contacts the front surface of the flange 12, and the outer peripheral wall 47 of the shielding shell 40 and the complementary wall 21 cover the outer periphery of the seal 30 over substantially the entire periphery.

The intermediate housing 10, the seal 30 and the shielding shell 40 may be assembled in any order. For example, the seal 30 may be mounted after the shielding shell 40 and the intermediate housing 10 are assembled first.

Unillustrated bolts are inserted through the screw insertion holes 49 of the shielding shell 40 and are screwed into the respective screw holes of the casing C to fix the shielding shell 40 to the casing C. At this time, the seal 30 is held in close contact with the outer surface of the casing C and the facing surface 17 of the flange 12 over the entire periphery with the seal main body 31 squeezed between these two surfaces.

A part of the outer surface of the casing C opposed to the seal 30 could be dented due to a cast nest. However, the facing surface 17 of the flange 12 presses the seal 30 tightly against the outer surface of the casing C to ensure a high sealing property.

The rib 46 of the shielding shell 40 is held in contact with a part of the flange 12 where the seal 30 is mounted. A clearance could be formed between the shielding shell and the flange if the shielding shell had no rib and the shielding shell and the flange relied entirely upon surface contact. In this situation, the flange could displace forward in the accommodation recess 43 to reduce adhesion between the seal 30 and the casing C. However, the rib 46 contacts the flange 12 to prevent a clearance between the flange 12 and the shielding shell 40 and to prevent forward displacement of the flange 12. Accordingly, a high sealing property can be reliably ensured.

The mounting wall 19 extends along substantially the entire inner periphery of the seal 30 to prevent inward displacements of all regions of the seal 30 even if an external force acts on the seal 30, for example, when the seal 30 is pressed while being fixed to the casing C and/or by vibration during use. Additionally, the enclosing portions 19A of the mounting wall 19 prevent deformation of the tubular engaging portions 32 while the remainder of the mounting wall 19 prevents deformation of the seal main body 31. Further, the outer peripheral wall 47 of the shielding shell 40 covers the outer peripheral side of the seal 30 to prevent outward displacement of the seal 30. The mounting wall 19 and the outer peripheral wall 47 also prevent inward and outward displacements of the shielding shell 40. Thus, the shielding shell 40 is held reliably in contact with both the outer surface of the casing C and the facing surface 17 of the flange 12 without displacement. As a result, a high sealing property is ensured.

As described above, the facing surface 17 of the flange 12 presses the seal 30 against the outer surface of the casing C to achieve close sealing contact even if the outer surface of the casing C is not smooth. Therefore, a high sealing property can be ensured.

A connector for a device according to a second embodiment of the present invention is illustrated in FIGS. 11 to 18 and includes an intermediate housing 100, a shielding shell 101 and a seal 102. Constructions of the second embodiment that are similar to the first embodiment are not described again, but rather merely are identified by the same reference numerals. Upper, lower, left and right sides in the following description correspond to the orientation of FIG. 11.

The intermediate housing 100 is made e.g. of synthetic resin and has a housing main body 11 in the form of a wide substantially rectangular parallelepiped. A plate-shaped flange 12 is formed at the rear end of the housing main body 11 and extends around substantially the entire periphery. A device-side projection 13 projects back from the rear surface of the flange 12. The intermediate housing 100 is mounted in the mount hole H of the casing C in a posture so that the housing main body 11 projects out of the casing C, and the device-side projection 13 is accommodated in the casing C.

The flange 12 faces an outer surface of the casing C, and engaging projections 18 are provided at a peripheral edge of a facing surface 17 of the flange 12 similar to the first embodiment. The engaging projections 18 are provided at three positions of each of upper and lower edges of the flange 12 and at one position substantially in the vertical center of the left edge in FIG. 12 (i.e. at a total of seven positions).

Similar to the first embodiment, a mounting wall 19 is formed on a peripheral edge of the facing surface 17 of the flange 12 over the entire periphery. The mounting wall 19 has enclosing portions 19A that enclose inner circumferential sides of the projecting engaging portions 18.

Similar to the first embodiment, the seal 102 is mounted on the facing surface 17 of the flange 12 and is held in close contact with the outer surface of the casing C to provide sealing between a peripheral edge of the mount hole H and the intermediate housing 100. The seal 102 is made of rubber or another resilient material and includes a seal main body 31 in the form of a ring that conforms in size to the outer periphery of the mounting wall 19. The seal 102 also has tubular engaging portions 32 that are mountable on the respective engaging projections 18. The main body 31 and the tubular engaging portions 32 are joined unitarily to each other by thin portions 33.

Similar to the first embodiment, the shielding shell 101 is mounted on the intermediate housing 100. The shielding shell 101 preferably is aluminum die-cast and has a wide substantially rectangular shape for covering the front surface and the peripheral surface of the flange 12. An accommodation recess 43 is formed in the rear surface of the shielding shell 101 and is capable of accommodating the flange 12.

Similar to the first embodiment, positioning bosses 44 and annular ribs 45 are formed in the accommodation recess 43. At least one rib 46 extends over substantially the entire peripheral edge of the accommodation recess 43.

A fitting opening 103 is formed in an area of the accommodation recess 43 of the shielding shell 101 and conforms to the outer shape of the housing main body 11. The fitting opening 103 is slightly displaced laterally (to the right in FIG. 14) from the widthwise center of the shielding shell 101.

The shielding shell 101 is fixed to the casing C and is made electrically conductive with the casing C by aligning screw insertion holes 49 in fixing portions 48 with screw holes of the casing C and tightening screws. Thus, the flange 12 is sandwiched between the outer surface of the casing C and the shielding shell 101. Additionally, the seal 102 mounted on the flange 12 is held in close contact with the outer surface of the casing C to provide sealing between the peripheral edge of the mount hole H of the casing C and the intermediate housing 100. In this way, similar to the first embodiment, the facing surface 17 of the flange 12 presses the seal 102 against the outer surface of the casing C to achieve close contact and a high sealing property.

The shielding shell 101 has screw tightening portions 104 in addition to the screw insertion holes 49 to screw-fix a wire-side shielding shell 62. The wire-side shielding shell 62 is screw-fixed to the shielding shell 101 with the front end held in contact with the front surface of the shielding shell 101. Thus, the shells 62, 101 cover the intermediate housing 100 and the wire-side housing 60. Accordingly, unlike the first embodiment, the shielding shell 101 does not need the back wall, thereby simplifying the construction. Further, the screw tightening portions 104 are provided in addition to the screw insertion holes 49 and can be provided at arbitrary positions in conformity with the shape of the wire-side shielding shell 62. Therefore, the shape of the wire-side shielding shell 62 is less complicated.

The invention is not limited to the above described and illustrated embodiments. For example, the following embodiments are also embraced by the technical scope of the present invention.

The wire-side terminals 61, the intermediate terminals 14 and the device-side terminals are connected by bolt tightening in the above embodiments. However, any connecting structure may be adopted to connect the terminals.

The seal 30 (102) mounted on the flange 12 is held in close contact with the outer surface of the casing C by fixing the shielding shell 40 (101) to the casing C in the above embodiments. However, the shielding member may be held in close contact with the outer surface of the casing by fixing the flange itself to the casing.

Although the shielding shell 40 (101) is provided with the rib 46 in the above embodiments, it is not always necessary to provide the rib.

The mounting wall 19 projects from the flange 12 and extends along the inner peripheral edge of the seal 30 (102) in the above embodiments. However, it is not always necessary to provide the mounting wall.

The mounting wall 19 has a ring shape that extends along the entire inner periphery of the seal 30 (102) in the above embodiments. However, the mounting wall may be interrupted in the peripheral direction.

The engaging projections 18 of the flange 12 and the tubular engaging portions 32 of the seal 30 (102) may not be provided.

The flange 12 includes the engaging projections 18 and the seal 30 (102) includes the tubular engaging portions 32 in the above embodiments. These engageable parts may have other shapes provided that these mating parts are projections and recesses engageable with each other. For example, the flange may include recesses and the seal may include projections.

Although the engaging projections 18 and the tubular engaging portions 32 are provided at a plurality of positions in the above embodiments, they may be provided at only one position.

The engaging projections 18 need not have tapered ends. For example, they may have be thickened towards the projecting ends or may have a constant cross-sectional shape.

The tubular engaging portions 32 are engaged with the engaging projections 18 while being resiliently held in contact therewith in the above embodiments. However, they may not necessarily be engaged in such a state.

Although the mounting wall 19 includes the enclosing portions 19A in the above embodiments, the enclosing portions 19A may not be provided. For example, projecting distances of parts of the mounting wall corresponding to the tubular engaging portions may be made shorter, so that the thinner portions are arranged to cross over the mounting wall.

Although the shielding shell 40 (101) includes the outer peripheral wall 47 covering the outer peripheral side of the seal 30 (102) in the above embodiments, the outer peripheral wall may not necessarily be provided or may be formed on the flange portion instead of on the shielding shell.

Although the wire-side terminals 61 are connected with the intermediate terminals 14 in the above embodiments, the present invention is not limited to this and the intermediate terminals 14 may be directly connected with the ends of the wires.

What is claimed is:

1. A connector for supplying power to a device at least partly accommodated in a conductive casing, comprising:
    a housing to be mounted to a mount hole of the casing, the housing being formed with a flange having a facing surface arranged to face an outer surface of the casing when the housing is mounted to the mount hole;
    at least one terminal retained in the housing and having a first portion connectable with a power supply side and a second portion connectable with a device side; and
    a ring-shaped seal surrounding the mount hole and mounted to the facing surface of the flange that faces the outer surface of the casing the seal being held in close contact with the facing surface and the outer surface of the casing to provide sealing therebetween with the housing mounted on the casing; and
    a conductive shielding shell substantially covering a surface of the housing opposite to the facing surface, the shielding shell being fixed to the casing and having at least one rib contacting a part of the flange opposite the seal.

2. A connector for supplying power to a device at least partly accommodated in a conductive casing, comprising;
    a housing to be mounted to a mount hole of the casing, the housing being formed with a flange arranged to face an outer surface of the casing when the housing is mounted to the mount hole:
    at least one terminal retained in the housing and having a first portion connectable with a power supply side and a second portion connectable with a device side:
    a ring-shaped seal surrounding the mount hole and mounted to a facing surface of the flange that faces the outer surface of the casing, the seal being held in close contact with the facing surface and the outer surface of the casing to provide sealing therebetween with the housing mounted on the casing;
    engaging projections projecting from the flange towards the casing; tubular engaging portions formed unitary to the seal and fittable to the engaging projections of the flange; and
    a mounting wall projecting from the flange wherein the mounting wall extends along an inner peripheral edge of the seal and along outer peripheries of the tubular engaging portions.

3. The connector of claim 1, wherein the shielding shell includes an outer peripheral wall for at least partly covering an outer peripheral side of the seal.

4. The connector of claim 1, wherein the flange includes at least one mounting wall standing up substantially along an inner peripheral edge of the seal.

5. The connector of claim 4, wherein the mounting wall has a substantially ring shape in conformity with the inner peripheral edge of the seal.

6. The connector of claim 4, wherein the flange and the seal include engaging portions configured for engaging the flange with the seal.

7. The connector of claim 6, wherein a plurality of engaging portions are provided along a peripheral direction of the seal.

8. The connector of claim 6, wherein at least one of the engaging portions is a projection tapered towards a projecting end thereof.

9. The connector of claim 6, wherein the engaging portion of the seal is engaged with the engaging portion of the flange portion while being resiliently held in contact therewith.

10. The connector of claim 6, wherein the engaging portions include an engaging projection projecting from the flange towards the casing and a tubular engaging portion formed unitary to the seal member and fittable to the engaging projection.

11. The connector of claim 2, wherein the mounting wall has a substantially annular ring shape in conformity with the inner peripheral edge of the seal.

12. The connector of claim 1, wherein the shielding shell includes an outer peripheral wall for at least partly covering an outer peripheral side of the seal.

13. The connector of claim 11, wherein the flange has a surface opposite to the facing surface substantially covered by a conductive shielding shell fixed to the casing.

14. The connector of claim 13, wherein the shielding shell has at least one rib contacting a part of the flange opposite the seal.

* * * * *